(12) United States Patent
Sugita et al.

(10) Patent No.: US 6,685,381 B1
(45) Date of Patent: Feb. 3, 2004

(54) RETAINING ARRANGEMENT FOR A ROD MEMBER

(75) Inventors: Juichi Sugita, Yokohama (JP);
Toshiharu Yoshizawa, Yokohama (JP);
Junji Orihashi, Yokohama (JP)

(73) Assignees: NHK Spring Co., Ltd., Kanagawa (JP); Yokohama Kiko Co., Ltd., Kanagawa (JP)

( * ) Notice: Subject to any disclaimer, the term of this patent is extended or adjusted under 35 U.S.C. 154(b) by 0 days.

(21) Appl. No.: 09/673,933

(22) PCT Filed: Apr. 22, 1999

(86) PCT No.: PCT/JP99/02139

§ 371 (c)(1),
(2), (4) Date: Dec. 20, 2000

(87) PCT Pub. No.: WO99/54157

PCT Pub. Date: Oct. 28, 1999

(30) Foreign Application Priority Data

Apr. 23, 1998 (JP) .............................. 10-113810
Sep. 21, 1998 (JP) .............................. 10-266018
Sep. 24, 1998 (JP) .............................. 10-268847

(51) Int. Cl.⁷ ................................................ F16D 1/00
(52) U.S. Cl. ...................... 403/341; 403/274; 403/282; 280/124.152
(58) Field of Search ............................. 384/273, 274, 384/295, 296; 280/124.152; 403/274, 282, 283, 341

(56) References Cited

U.S. PATENT DOCUMENTS

| 2,283,918 A | * | 5/1942 | Dekome ................ 29/898.056 |
| 3,589,700 A | * | 6/1971 | Ruet et al. ................ 280/5.515 |
| 3,820,860 A | * | 6/1974 | Stone ........................ 384/222 |
| 3,848,839 A | * | 11/1974 | Tillman ...................... 248/74.2 |
| 4,426,162 A | * | 1/1984 | Tsuchiya et al. ......... 384/295 X |
| 4,808,144 A | * | 2/1989 | Orain ....................... 384/295 X |
| 4,909,638 A | * | 3/1990 | Muto ....................... 384/295 X |
| 4,916,749 A | * | 4/1990 | Urban et al. ................ 384/125 |
| 4,924,523 A | * | 5/1990 | Gojon ......................... 384/273 |

(List continued on next page.)

FOREIGN PATENT DOCUMENTS

| DE | 19650299 A1 | 6/1997 |
| EP | 0251845 A1 | 1/1988 |

(List continued on next page.)

OTHER PUBLICATIONS

Patent Abstracts of Japan, JP 62 207518, Sep. 11, 1987.
Patent Abstracts of Japan, JP 04 349012, Dec. 3, 1992.

(List continued on next page.)

*Primary Examiner*—Lynne H. Browne
*Assistant Examiner*—Aaron Dunwoody
(74) *Attorney, Agent, or Firm*—MacPherson Kwok Chen & Heid LLP

(57) ABSTRACT

A retaining arrangement for restricting an axial movement of a rod member such as an automotive stabilizer supported by a stay member, comprising a tubular retaining assembly fitted on the rod member adjacent to the stay member so that the axial movement of the rod member may be restrained by the engagement between the retaining assembly and the stay member. The retaining assembly may consist of a plurality of part-annular segments or a C-shaped member which can be fitted onto the rod member from sideways, and fully surround the rod member. To ensure a secure attachment of the retaining assembly to the rod member, a rugged member such as abrasive grains or a rugged surface pattern may be interposed between an outer circumferential surface of the rod member and an inner circumferential surface of the retaining assembly.

3 Claims, 5 Drawing Sheets

U.S. PATENT DOCUMENTS

| | | | | |
|---|---|---|---|---|
| 5,000,611 A | | 3/1991 | Reinhart | 403/265 |
| 5,013,166 A | * | 5/1991 | Domer | 384/295 X |
| 5,084,963 A | * | 2/1992 | Murray et al. | 174/7 |
| 5,352,044 A | * | 10/1994 | Jordens et al. | 384/140 |
| 5,520,465 A | * | 5/1996 | Kammel | 384/220 |
| 5,660,256 A | * | 8/1997 | Gallmeyer et al. | 188/379 |
| 5,688,054 A | * | 11/1997 | Rabe | 384/295 |
| 5,836,699 A | * | 11/1998 | Back et al. | 384/295 X |
| 6,086,327 A | * | 7/2000 | Mack et al. | 384/273 X |
| 6,234,678 B1 | * | 5/2001 | Tsuji et al. | 384/273 |

FOREIGN PATENT DOCUMENTS

| | | |
|---|---|---|
| EP | 0381566 A1 | 1/1990 |
| EP | 0805055 A1 | 11/1997 |
| EP | 0811667 A2 | 12/1997 |
| FR | 2564043 A1 | 11/1985 |
| GB | 2263250 A | 7/1993 |
| JP | 4-133907 | 12/1992 |

OTHER PUBLICATIONS

Patent Abstracts of Japan, JP 09 269028, Oct. 14, 1997.
English Translation of Japanese Utility Model Laid–Open Publication No. 4–133907, Laid–Open on Dec. 14, 1992.

* cited by examiner

RETAINING ARRANGEMENT FOR A ROD MEMBER

TECHNICAL FIELD

The present invention relates to a retaining arrangement for restricting an axial movement of a rod member supported by a stay member by attaching a retaining assembly onto an outer circumferential surface of the rod member adjacent to the stay member, and in particular to a retaining arrangement for a rod member suitable for use in connection with a stabilizer for a vehicle suspension system.

BACKGROUND OF THE INVENTION

In case of a stabilizer for vehicles such as an anti-roll bar which is curved at both ends into the shape of letter-U, for instance, each end of the middle section of the rod member (stabilizer) adjacent to the two curved portions thereof are supported by the vehicle body, and the outer ends of the curved portions are supported by the corresponding suspension arms. The support arrangement by the vehicle body typically involves the use of a rubber bush surrounding the stabilizer and a U-shaped stay wrapped around the rubber bush and attached to the vehicle body.

However, the stabilizer may be subjected to a lateral force or an axial force at the middle section of the stabilizer during the operation of the vehicle, and such a lateral force could be so great that the rubber bush and the stay are incapable of properly withstanding it. When the deformation of the rubber bush is excessive, adjacent components may rub each other, and this could cause undesired noises, and damages to the link member that is attached to the outer end of each curved portion. In particular, such occurrences tend to impair the durability and the reliability of the stabilizer, and the ride quality.

In view of this fact, it has been proposed to securely fit and crimp a metallic washer onto a part of the stabilizer adjacent to the corresponding rubber bush so as to restrict the axial deformation of the rubber bush. However, this proposal requires the metallic washer to be fitted from an end of the stabilizer, and this impairs the efficiency of the production process, and could reduce the resistance of the stabilizer against corrosion because the crimped portion may not be properly coated by paint.

It has also been proposed to fit another rubber bush having flanges on either axial ends thereof onto the part of the stabilizer adjacent to the existing rubber bush, in place of the washer, and secure this new rubber bush with a clip band so as to control the axial deformation of the existing rubber bush. However, the assembling of the new rubber bush and the clip band has to be carried out manually, and it results in a significant reduction in the production efficiency. Furthermore, the necessary mechanical resistance of at least 2 kN against the lateral deformation may not be ensured because the new rubber bush tends to relatively readily deform, and may not be entirely adequate as a retaining assembly.

Further, Japanese UM laid open publication No. 04-133907 discloses the use of two semi-annular halves which can be combined into a fully annular member fitted around the stabilizer. The stabilizer is provided with an annular groove for partly receiving the fully annular member, and the annular member is then covered by a rubber bush.

This arrangement prevents the lateral shifting of the rubber bush, but the annular groove formed around the stabilizer not only causes a stress concentration and reduces the torsional mechanical strength of the stabilizer, but also may impair the performance of the torsion bar. It could be compensated by increasing the outer diameter of the stabilizer, but the resulting increase in size and weight is not desirable.

The same problem exists not only in stabilizers but also in any other supporting structures for a rod member where the axial shifting of the rod member is desired to be prevented.

The present invention was made in view of such problems of the prior art, and its primary object is to provide a retaining arrangement for a rod member which can prevent the lateral shifting of the rod member by using a simple structure, and which is suited for an automated assembly process while ensuring a sufficient durability and mechanical strength.

BRIEF SUMMARY OF THE INVENTION

According to the present invention, such an object can be accomplished by providing a retaining arrangement for restricting an axial movement of a rod member supported by a stay member, comprising: a tubular retaining assembly fitted on the rod member adjacent to the stay member; and a rugged member interposed between an outer circumferential surface of the rod member and an inner circumferential surface of the retaining assembly, and pushed into the material of at least one of the retaining assembly and the rod member.

The rugged member may comprises either abrasive grains interposed between the outer circumferential surface of the rod member and the inner circumferential surface of the retaining assembly or a rugged surface pattern formed at least in one the of the outer circumferential surface of the rod member and the inner circumferential surface of the retaining assembly. In the former case, the abrasive grains may be mixed with a bonding agent which is coated on a corresponding surface so as to simplify the assembling process. In either case, the retaining assembly can be sufficiently firmly attached to the rod member without requiring any bulky, complex or expensive arrangement and without diminishing the mechanical strength and performance of the rod member.

In particular, when the rod member consists of an automotive stabilizer, it is preferable to be able to fit the retaining assembly onto the rod member from sideways. To achieve this goal, the retaining assembly comprises either a plurality of part-annular segments which are mutually connected to one another via an engagement arrangement so as to jointly form an annular shape closely surrounding the rod member or a single C-shaped member having an relatively flexible middle part, and an engagement arrangement formed on opposing ends thereof so as to form an annular shape closely surrounding the rod member when the opposing ends are joined to each other. The engagement arrangement preferably comprises a recess and a projection having an enlarged head which are formed at the opposing ends of the C-shaped member, respectively, the projection being adapted to be crimped or press fitted into the recess.

When it is desired to reduce the pressure that is required to fully engage the engage arrangement while pressing the remaining part of the retaining assembly onto the rod member, the retaining assembly may have a shape selected from a group consisting of ellipsis, trapezoid and polygon when the part-annular segments are combined without placing the engagement arrangement fully engaged with each other, the shape conforming to the outer circumferential surface of the rod member when the engagement arrangement is fully engaged.

Preferably, the retaining assembly essentially consists of aluminum or an aluminum alloy for the convenience of handling. The abrasive grains may consist of readily available abrasive grains such as synthetic alumina abrasive material and synthetic silicon carbide abrasive material.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
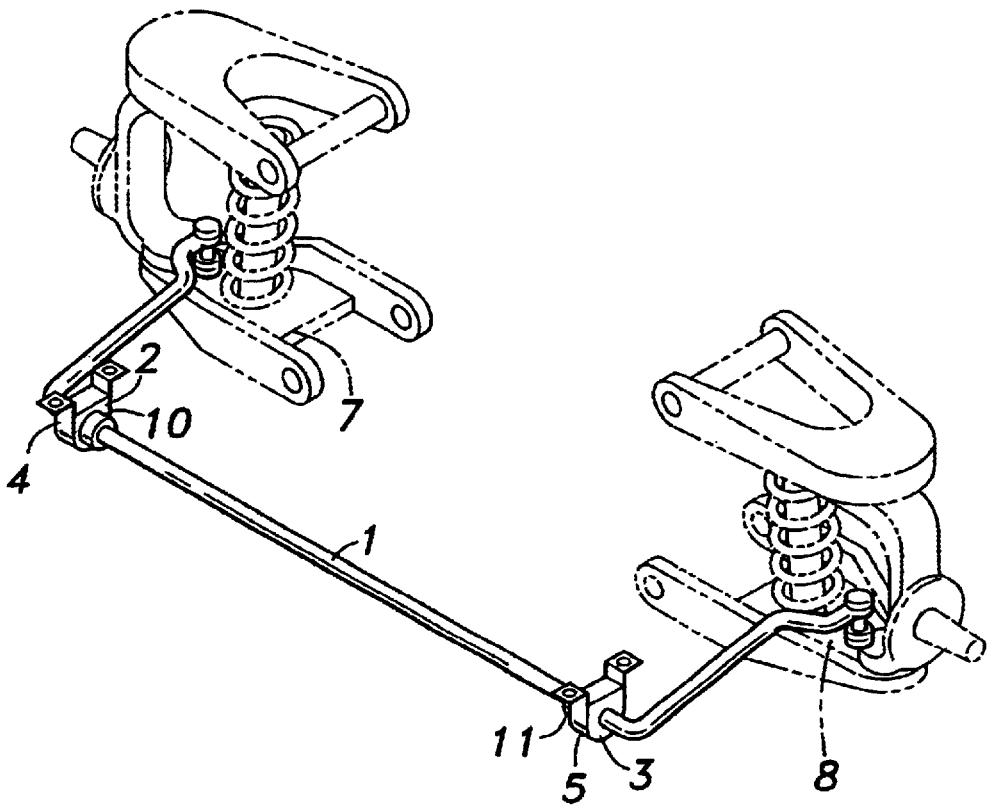
FIG. 1 is a perspective view of an automotive stabilizer assembly embodying the present invention.

FIG. 1 is a perspective view of an automotive stabilizer embodying the present invention. The stabilizer 1 has two curved end portions so as to have a generally U-shaped form, and a pair of rubber bushes 2 and 3 are fitted on either end of the middle section of the stabilizer 1 adjacent to the curved end portions. These rubber bushes 2 and 3 are supported on a lower part of the vehicle body not shown in the drawing via stays 4 and 5. The free end of each curved portion is retained to a suspension arm 7 and 8 via a rubber bush. An annular retaining assembly 10 or 11 made of an aluminum member is fitted on a part of the stabilizer 1 adjacent to the corresponding one of the rubber bushes 2 and 3.

Figure 2:
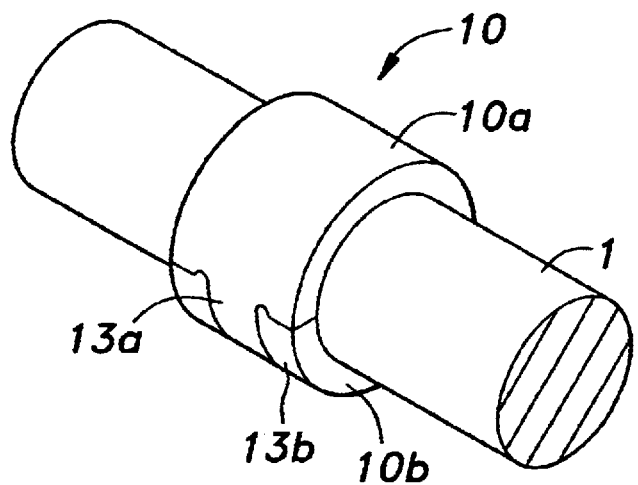
FIG. 2 is an enlarged view of an essential part of FIG. 1.

As best shown in FIG. 2 which is an enlarged view of an essential part of FIG. 1, the retaining assembly 10 is formed by jointing a pair of semi-annular halves 10a and 10b. The opposing ends of the semi-annular halves 10a and 10b are provided with cooperating engagement portions 13a and 13b. One of the engagement portions 13a is provided with a head and a neck while the other of the engagement portions 13b is provided with a recess 13b which is adapted to receive the head of the one engagement portion 13a. By virtue of the engagement between the cooperating engagement portions 13a and 13b, the two halves 10a and 10b are kept securely combined as a fully annular retaining assembly 10.

Figure 3A:
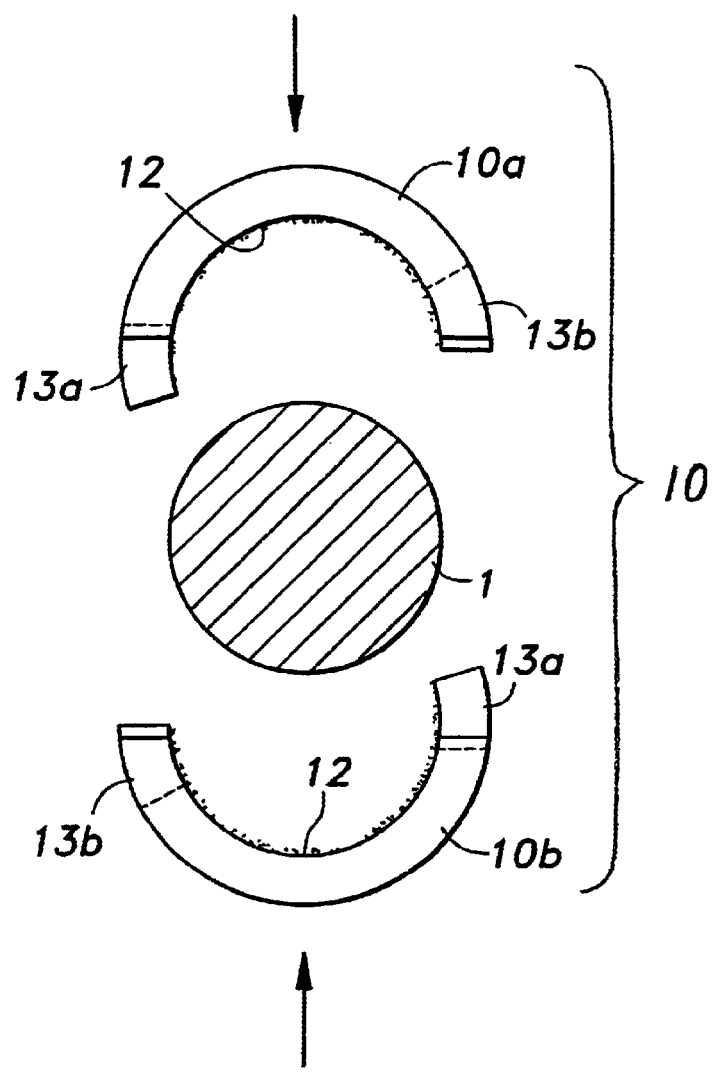
FIGS. 3(a) and 3(b) are a sectional view and a front view of the retaining assembly for showing the process of assembling the retaining assembly.
Figure 3B:
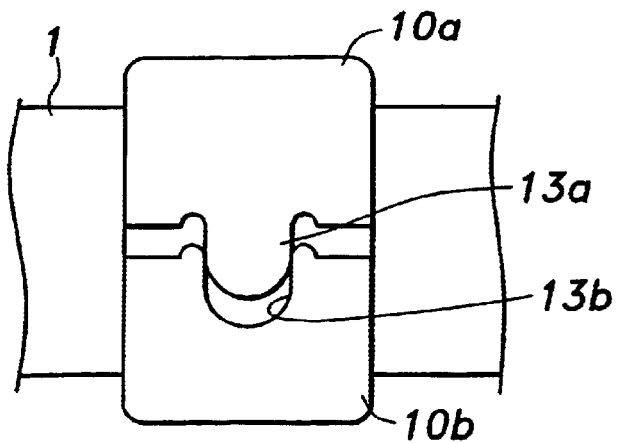

The inner bore of the two halves 10a and 10b is somewhat smaller in diameter than the outer diameter of the stabilizer 1 when they are simply put together. The two halves 10a and 10b are put together so as to jointly surround the stabilizer 1 as illustrated in FIG. 3(a), and are pressed (crimped) radially inwardly from outside into plastic deformation. As a result, the inner circumferential surface of the two halves 10a and 10b is pressed onto the outer circumferential surface of the stabilizer 1, and the cooperating engagement portions 13a and 13b are engaged with each other. Thus, the state illustrated in FIG. 2 is obtained.

Abrasive grains 12 are bonded to the entire inner circumferential surface of the two halves 10a and 10b or to the entire inner circumferential surface of the retaining assembly 10 as a means for preventing slippage in the corresponding interface. These abrasive grains 12 bite into the mutually opposing surfaces, and firmly secure the two parts relative to each other. The abrasive grains 12 preferably consist of alumina abrasive material or silicon carbide abrasive material specified in JIS (Japanese Industrial Standards) R611 under synthetic abrasive materials. In particular, when the abrasive grains 12 consist of alumina abrasive material or the like which would not be kept attached in a coated state when used alone, the abrasive grains 12 may be mixed with a quick drying bonding agent of a single liquid type so as to be coated in a simple manner. Thus, the abrasive grains are kept attached during the assembly process, and the work efficiency can be improved.

The other retaining assembly 11 is not different in structure from the first mentioned retaining assembly 10, and is therefore not described herein.

When the stabilizer 1 is subjected to a lateral force or, in other words, when the middle section of the stabilizer 1 is subjected to an axial force, either one of the retaining assemblies 10 and 11 abuts the corresponding rubber bush 2 or 3 or stay 4 or 5, and the lateral shifting of the stabilizer 1 is thereby avoided.

As an exemplary arrangement for preventing the lateral shifting of a stabilizer having a diameter of 30 mm, a retaining assembly was prepared from a pair of semi-annular halves made of aluminum strip which is 4 mm in thickness and 17 mm in width. The thickness and width of the material for the retaining assembly, the particle size of the abrasive grains, and the dimensions of the semi-annular halves before assembly may be freely selected according to the lateral force that is applied to the stabilizer and other specifications. For instance, when the particle size of the abrasive grains consisting of alumina abrasive material was in the range of #46 to #120, satisfactory results with respect to the capability to withstand lateral loads were obtained. When more coarse abrasive grains were used, excessive abrasion marks were formed on the paint coat on the rod member. Conversely, when finer abrasive grains were used, the retaining force substantially diminished. Therefore, the aforementioned range was found to be proper for the retaining assembly.

When different target values for the retaining force are selected depending on the specifications of the stabilizer, the amount of the abrasive grains consisting of alumina abrasive material or the like may be adjusted so that a desired retaining force may be obtained. The retaining force may be predicted from the ratio of the coated area of the abrasive grains to the total surface area of the inner circumferential surface of the retaining assembly.

Figure 4:
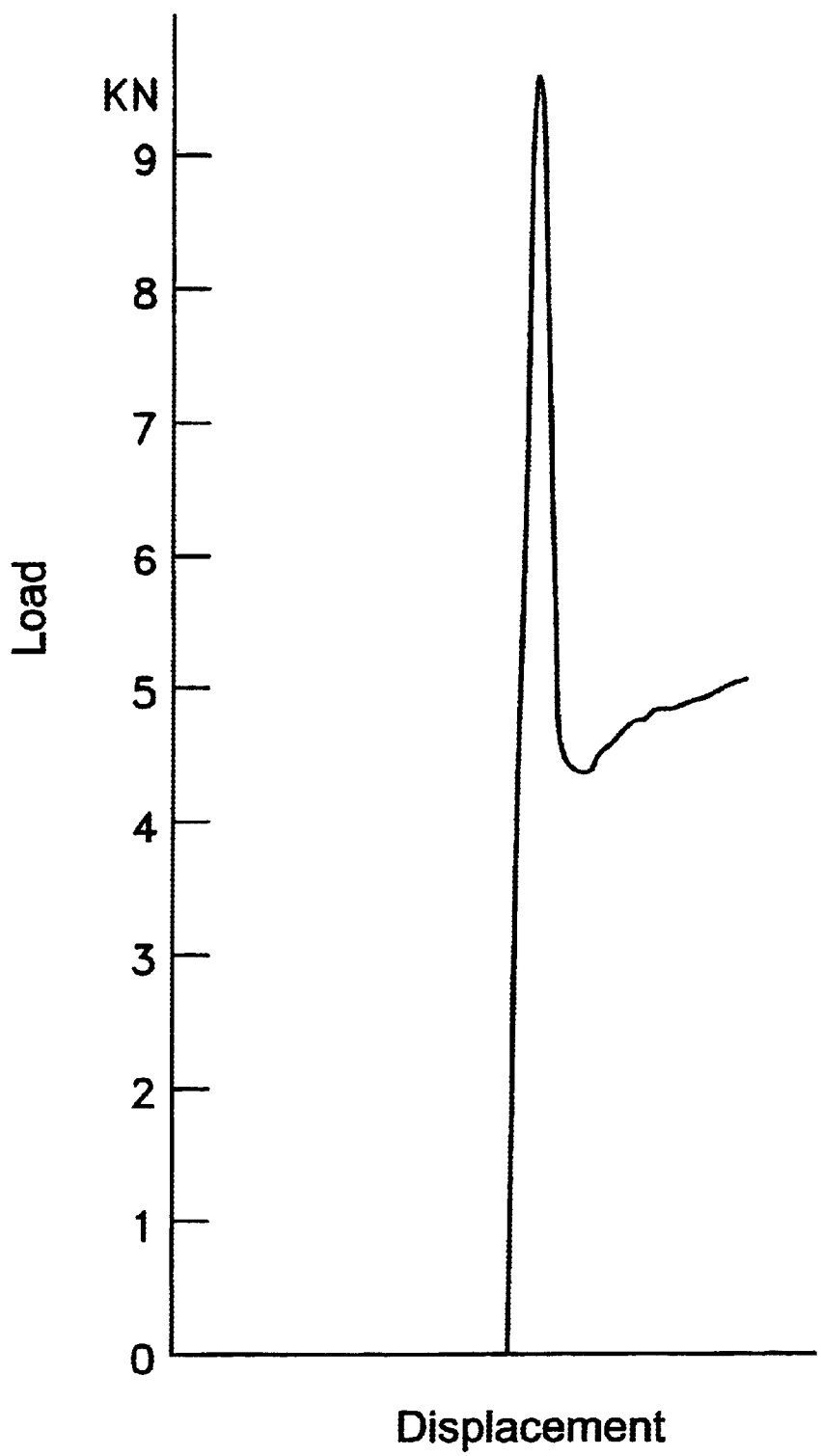
FIG. 4 is a graph showing the relationship between the lateral load and the lateral shifting of the stabilizer in the arrangement for preventing the lateral shifting of a rod member according to the present invention.

FIG. 4 shows a result of measuring the relationship between the lateral force and the lateral displacement. As shown in this graph, the arrangement proposed by the present invention has an adequate resistance to lateral shifting in excess of the standard target value of 2 kN. Similar results were obtained when silicon carbide abrasive material was used for the abrasive grains instead of alumina abrasive material.

Aluminum was used for the material of the retaining assembly in the above described embodiments, but the material may also consist of soft steel, hard plastic or reinforced plastic. When a retaining assembly made of soft steel is fitted on a rod member made of iron, the formation of rust on the rod member can be controlled by applying a zinc paint coat over the rod member because zinc has a higher ionizing tendency than iron. The abrasive grains may be mixed in the zinc paint in this case. When a plastic material is selected for the material of the retaining assembly, the retaining assembly may be thermally bonded onto the rod member. In this case, it is preferable if the retaining assembly is pressed radially from outside before or after the thermal bonding process so that the abrasive grains may bite into the rod member.

Figure 5A:
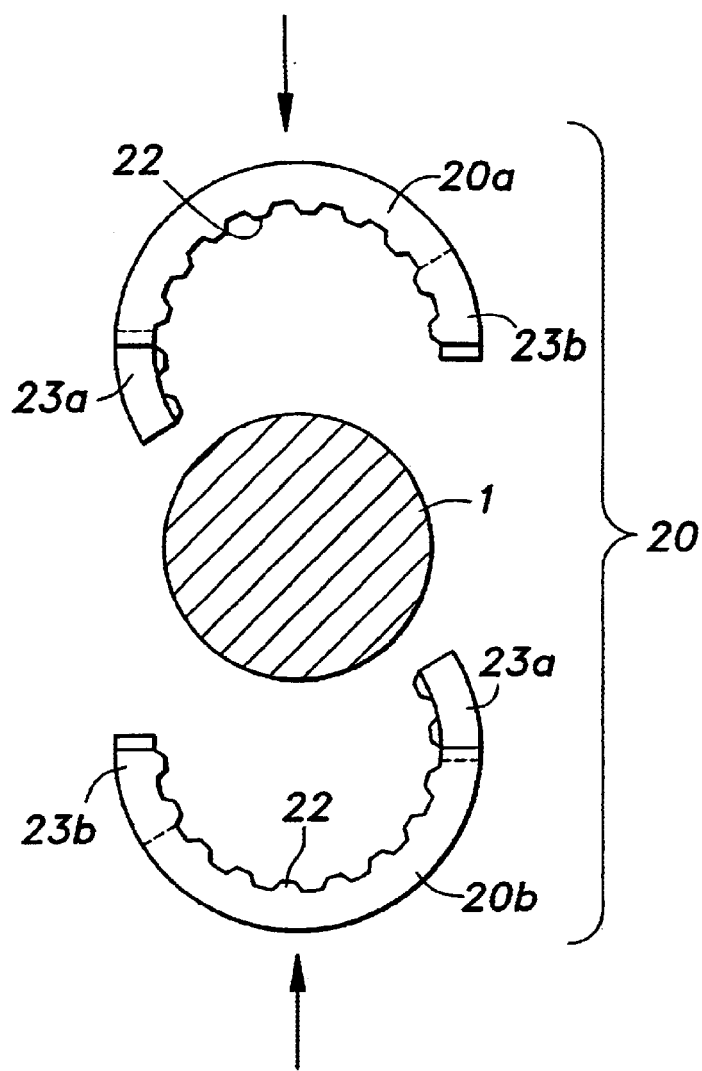
FIGS. 5(a) and 5(b) are views similar to FIGS. 3(a) and 3(b), respectively, showing another embodiment of the retaining assembly according to the present invention.
Figure 5B:
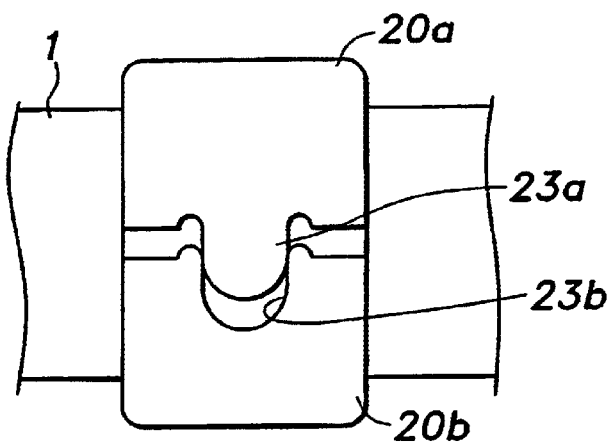
Figure 6:
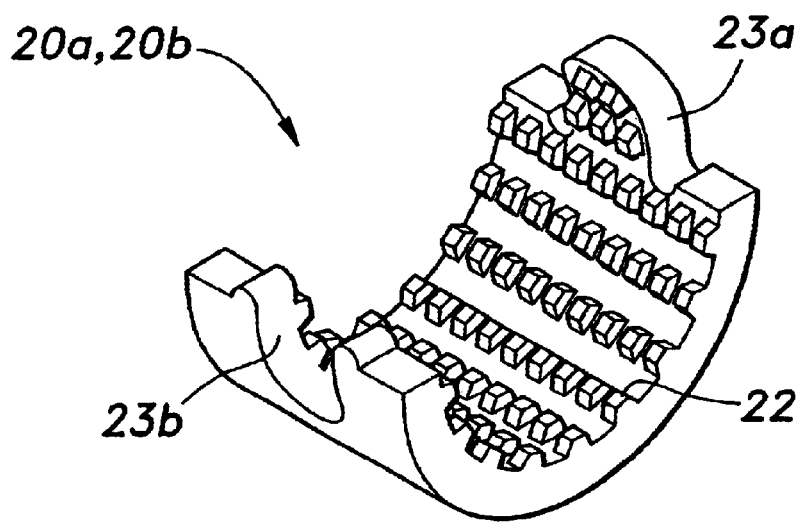
FIG. 6 is a perspective view of one of the two halves of the retaining assembly shown in FIGS. 5(a) and 5(b)

FIGS. 5 and 6 show another embodiment of the present invention. Referring to FIG. 5, the retaining assembly 20 is formed by joining a pair of semi-annular halves 20a and 20b. The opposing ends of the semi-annular halves 20a and 20b are provided with cooperating engagement portions 23a and 23b. One of the engagement portions 23a is provided with a head and a neck while the other of the engagement portions 23b is provided with a recess 23b which is adapted to receive the head of the one engagement portion 23a. By virtue of the engagement between the cooperating engagement portions 23a and 23b, the two halves 20a and 20b are kept securely combined as a fully annular retaining assembly 20.

The inner bore of the two halves 20a and 20b is somewhat smaller in diameter than the outer diameter of the stabilizer 1 when they are simply put together. The two halves 20a and 20b initially aligned as illustrated in FIG. 5(a) are put together so as to jointly surround the stabilizer 1 as illustrated in FIG. 5(b), and are pressed (crimped) radially inwardly from outside into plastic deformation. As a result, the inner circumferential surface of the two halves 20a and 20b is pressed onto the outer circumferential surface of the stabilizer 1, and the cooperating engagement portions 23a and 23b are engaged with each other. Thus, the state similar to that illustrated in FIG. 2 is obtained.

As shown in FIG. 6, the entire inner circumferential surface of the two halves 20a and 20b or the entire inner circumferential surface of the retaining assembly 20 is formed with a rugged surface pattern 22 for preventing slippage by cutting a number of V-grooves therein. The rugged surface pattern 22 bites into the outer circumferential surface of the stabilizer 1, and firmly secure the two arts relative to each other.

The rugged surface pattern 22 was formed in the inner circumferential surface of the retaining assembly 20 in the illustrated embodiment, but may be either alternatively or additionally formed in the outer circumferential surface of the stabilizer 1 or the rod member.

As an exemplary arrangement for preventing the lateral shifting of a stabilizer having a diameter of 22 mm, a retaining assembly was prepared from a pair of semi-annular halves made of aluminum material specified by JIS 5052 P-H34 (Brinell hardness (10/500): 68, tensile strength (N/mm$^2$): 260). Aluminum strip which is 3 mm in thickness and 12.5 mm in width was formed into a semi-annular shape by using a central die having an outer diameter of 23 mm. Thereafter, V-grooves were formed in the inner circumferential surface so as to define the rugged surface by repeatedly applying a press die with a press load of 8 tons. The two halves are then fitted around the stabilizer by plastically deforming them by using a crimping die which is 27.2 mm in diameter under the press load of 15 tons so as to form the final retaining assembly.

The retaining assembly thus prepared was capable of withstanding the shifting load of 2.5 kN to 5 kN, which is substantially larger than the prescribed target value, the variation of the limit value being depending on the location of installing the retaining assembly.

The thickness and width of the material for the retaining assembly, the rugged surface pattern, and the dimensions of the semi-annular halves before assembly may be freely selected according to the lateral force that is applied to the stabilizer and other specifications. The rugged surface pattern may also be formed as a diamond knurling pattern of module 0.5 which is specified in JIS B0951.

The retaining assembly was made of aluminum material specified by JIS 5052 P-H34, but may consist of any other harder material such as steel. When steel is used for making the retaining member, the formation of rust on the rod member can be controlled by applying a zinc paint coat over the rod member because zinc has a higher ionizing tendency than iron. However, a harder material is more difficult to work with.

Figure 7:
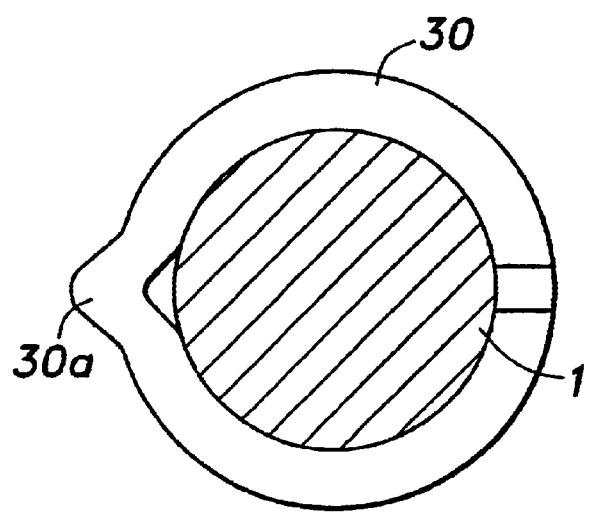
FIG. 7 is a sectional view of yet another embodiment of the retaining assembly according to the present invention.

FIG. 7 is a side view of yet another embodiment of the retaining assembly 30 for preventing the lateral shifting of a rod member according to the present invention. In this embodiment, the retaining assembly 30 consists of a single member even before assembly, and has a generally C-shaped profile. A U-shaped slack portion 30a is formed in a middle section thereof. The opposing ends are provided with mutually cooperating engagement portions which are similar to those of the previous embodiment. Therefore, the retaining assembly 30 can be formed in a single step by stamp forming, and the component part management is therefore simplified. In this case, either small particles for preventing slippage may be installed between the inner circumferential surface of the retaining assembly 30 and the outer circumferential surface of the stabilizer 1 or a rugged surface pattern may be formed in at least one of the inner circumferential surface of the retaining assembly 30 and the outer circumferential surface of the stabilizer 1.

This retaining assembly 30 is fitted on the stabilizer 1, and is pressed (crimped) radially from outside. This causes the U-shaped slack portion 30a to extend, and the cooperating engagement portions to engage each other so that the retaining assembly 30 is firmly attached to the stabilizer 1. This arrangement is otherwise similar to those of the previous embodiments. For instance, either abrasive grains are interposed between the inner circumferential surface of the retaining assembly 30 and the outer circumferential surface of the stabilizer 1, and bite into the material of the two surfaces or a rugged surface pattern is formed in at least one of the inner circumferential surface of the retaining assembly 30 and the outer circumferential surface of the stabilizer 1 so that the two parts are firmly attached to each other.

The rod member consisted of an automotive stabilizer in the above described embodiments, but, as can be readily appreciated by a person skilled in the art, the present invention can be applied to all support structures where a rod member is desired to be supported so as not to shift in the axial direction. The rod member may consist of either a solid or hollow member, and the material thereof may consist of steel, nonferrous metals, plastics or any other materials.

The retaining assembly before assembly was annular in shape or has a circular end surface in the above described embodiments, but may also be elliptic, trapezoidal or polygonal. The outer circumferential surface of the stabilizer was brought into contact with the inner circumferential surface of the retaining assembly, and the cooperating engagement portions were engaged with each other by applying pressure (crimping) and causing plastic deformation in the above described embodiments. However, such deformation involving elongation tends to require a high pressure. The necessary pressure may be reduce if the shape of the retaining assembly before assembly is elliptic, trapezoidal or polygonal while making the overall length of the retaining assembly substantially equal to the length of the outer circumference of the stabilizer so that the close contact may be established between the outer circumferential surface of the stabilizer and the inner circumferential surface of the retaining assembly by virtue of bending deformation, and the deformation caused by the biting of the abrasive grains into the outer circumferential surface of the stabilizer and the inner circumferential surface of the retaining assembly or the biting of the rugged surface pattern into at least one of the outer circumferential surface of the stabilizer and the inner circumferential surface of the retaining assembly with the aid of the engagement between the cooperating engagement portions.

INDUSTRIAL APPLICABILITY

As can be appreciated from the above description, in the arrangement for preventing the lateral shifting of a rod member according to the present invention, either an annular retaining assembly is formed by a plurality of segments which are joined with one another at their end portions so as to surround the rod member and is pressed onto the outer circumferential surface of the rod member, or the annular retaining assembly is given with a generally C-shaped form including a portion which is locally bendable before assembly, and may be adapted to press onto the outer circumferential surface of the rod member with the end portions mutually engaged with each other. Additionally, either small particles for preventing slippage are interposed between the outer circumferential surface of the rod member and the inner circumferential surface of the retaining assembly or a rugged surface pattern for preventing slippage is formed in at least one of the outer circumferential surface of the stabilizer and the inner circumferential surface of the retaining assembly. By using such a simple arrangement, it is possible to firmly attach the retaining assembly to the rod member, and positively prevent the axial shifting of the rod member. Additionally, this arrangement allows an adequate durability and mechanical strength to be achieved, and is adapted for automated assembly work.

Although the present invention has been described in terms of preferred embodiments thereof, it is obvious to a person skilled in the art that various alterations and modifications are possible without departing from the scope of the present invention which is set forth in the appended claims.

What is claimed is:

1. A retaining arrangement for restricting an axial movement of a rod member (1) supported by a stay member (4, 5), comprising:

said rod member (1);

said stay member (4, 5); and a tubular retaining assembly (20, 30) fitted on said rod member (1) adjacent to said stay member (4, 5), wherein an inner circumferential surface of said tubular retaining assembly (20, 30) includes a rugged surface pattern (22), and said inner circumferential surface of said retaining assembly (20, 30) is pressed against an outer circumferential surface of said rod member (1) so that said rugged surface pattern (22) is pushed into the material of said rod member (1), and wherein said retaining assembly (20, 30) comprises a single C-shaped member (30) having a relatively flexible middle part (30a), and an engagement arrangement formed on opposing ends thereof so as to form an annular shape closely surrounding said rod member (1) when said opposing ends are joined to each other.

2. A retaining arrangement for restricting an axial movement of a rod member (1) supported by a stay member (4, 5), comprising:

said rod member (1);

said stay member (4, 5); and a tubular retaining assembly (20, 30) fitted on said rod member (1) adjacent to said stay member (4, 5), wherein an inner circumferential surface of said tubular retaining assembly (20, 30) includes a rugged surface pattern (22), and said inner circumferential surface of said retaining assembly (20, 30) is pressed against an outer circumferential surface of said rod member (1) so that said rugged surface pattern (22) is pushed into the material of said rod member (1), wherein said retaining assembly (20, 30) comprises a single C-shaped member (30) having a relatively flexible middle part (30a), and an engagement arrangement formed on opposing ends thereof so as to form an annular shape closely surrounding said rod member (1) when said opposing ends are joined to each other, and wherein said engagement arrangement (23a, 23b) comprises a recess (23b) and a projection (23a) having an enlarged head, said recess and said projection being formed one of each at opposing ends of said C-shaped member (30), respectively, said projection (23a) being adapted to be crimped or press fitted into said recess (23b).

3. A retaining arrangement for restricting an axial movement of a rod member (1) supported by a stay member (4, 5), comprising:

said rod member (1);

said stay member (4, 5); and a tubular retaining assembly (20, 30) fitted on said rod member (1) adjacent to said stay member (4, 5), wherein an inner circumferential surface of said tubular retaining assembly (20, 30) includes a rugged surface pattern (22), and said inner circumferential surface of said retaining assembly (20, 30) is pressed against an outer circumferential surface of said rod member (1) so that said rugged surface pattern (22) is pushed into the material of said rod member (1), wherein said retaining assembly (20, 30) comprises a single C-shaped member (30) having a relatively flexible middle part (30a), and an engagement arrangement formed on opposing ends thereof so as to form an annular shape closely surrounding said rod member (1) when said opposing ends are joined to each other, and wherein said retaining assembly (20, 30) defines a shape selected from a group consisting of ellipsis, trapezoid and polygon when said opposing ends are brought close to each other without placing said engagement arrangement (23a, 23b) fully engaged with each other, said shape conforming to the outer circumferential surface of said rod member (1) when said engagement arrangement (23a, 23b) is fully engaged.

* * * * *